Oct. 18, 1949.  M. ROMAINE ET AL  2,484,910
VARIABLE SPEED MECHANISM
Filed Jan. 11, 1947  2 Sheets-Sheet 1

INVENTORS
Millard Romaine
Edgar D. Vancil
BY
H. K. Parsons & L. W. Wright.
ATTORNEYS

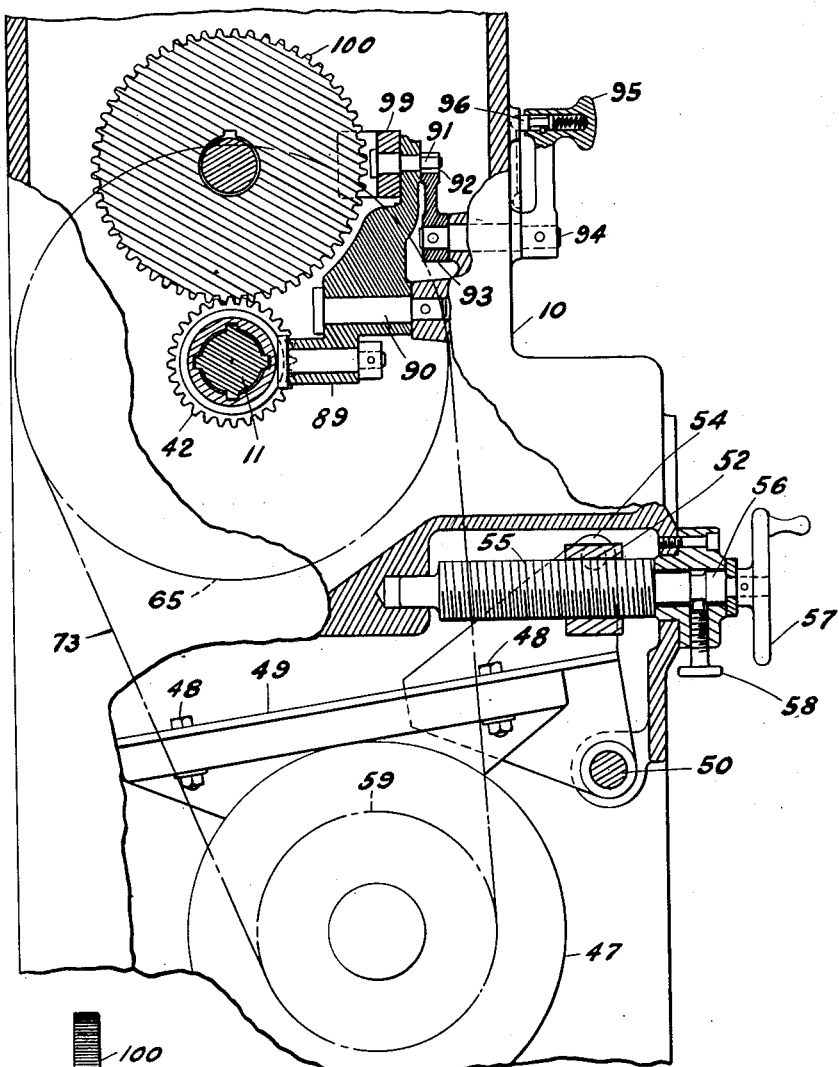
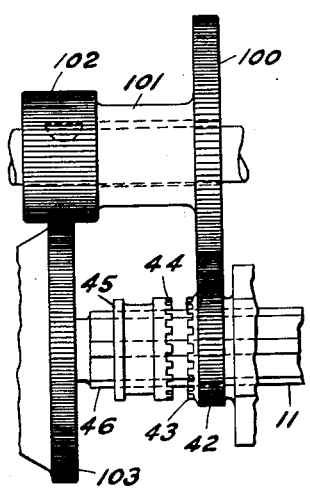
Fig. 2.
Fig. 3.
INVENTORS
Millard Romaine
Edgar D. Vancil
ATTORNEYS Patented Oct. 18, 1949

2,484,910

UNITED STATES PATENT OFFICE 2,484,910

VARIABLE-SPEED MECHANISM

Millard Romaine and Edgar D. Vancil, Cincinnati, Ohio, assignors to The Cincinnati Milling Machine Co., Cincinnati, Ohio, a corporation of Ohio Application January 11, 1947, Serial No. 721,500

6 Claims. (Cl. 74—217)

This invention relates to transmission mechanisms and more particularly to an improved variable speed transmission.

One of the objects of this invention is to provide an improved variable speed transmission mechanism which is simple, compact, and inexpensive to manufacture.

Another object of this invention is to provide a variable speed transmission mechanism which will yield a comparatively large number of variable speeds but which is composed of a relatively few number of parts.

An additional object of this invention is to provide a variable speed transmission mechanism which is especially adaptable for use in small machines because of its compact construction and relatively few number of parts but which will yield a larger number of speed rates than is now attainable with present devices utilized in small machines.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 2 is a section on the line 2—2 of Figure 1.

Figure 3 is a detail view showing the back gear arrangement of this transmission.

Figure 1:
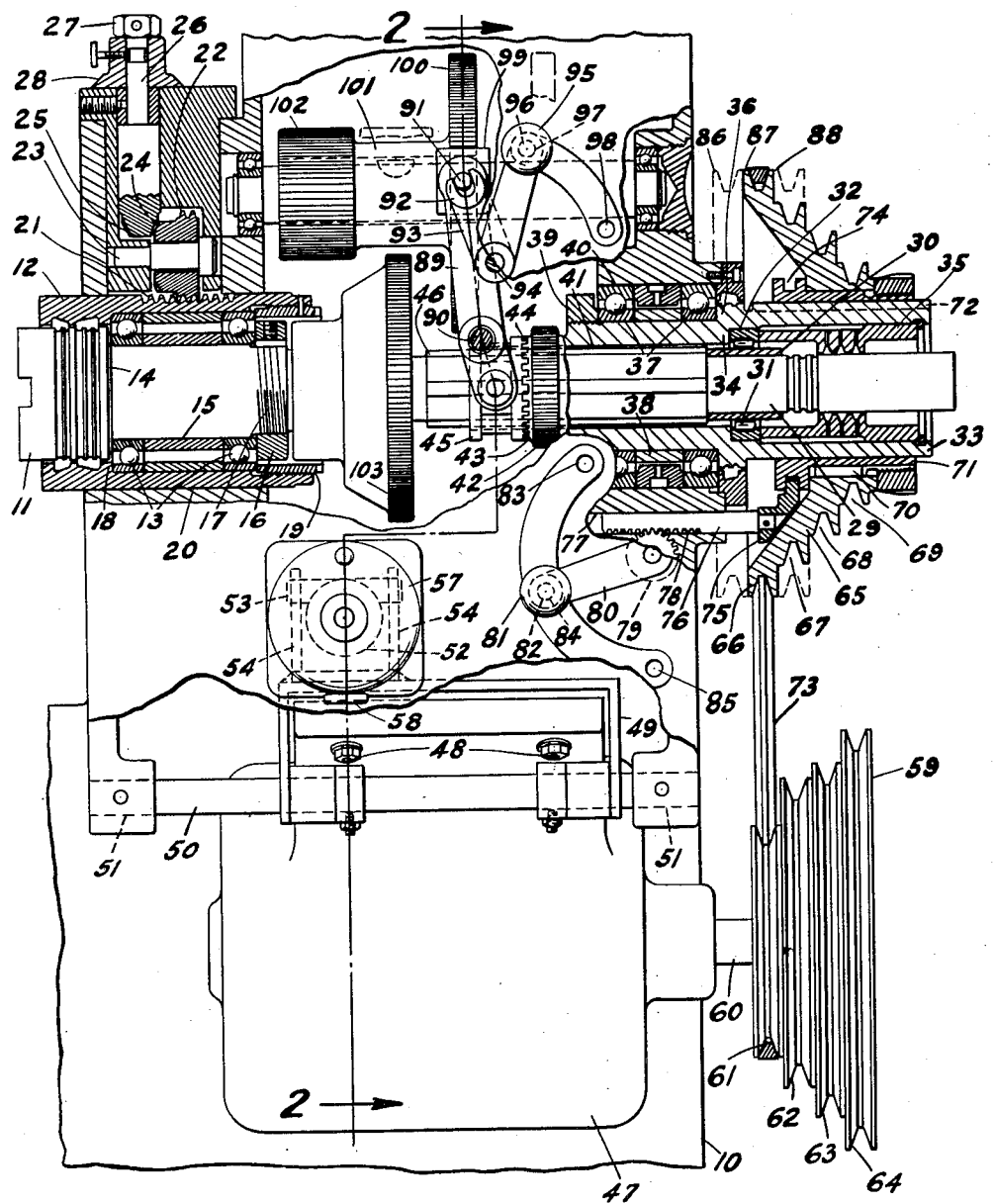
Figure 1 is an elevational view partly in section showing the general arrangement of the transmission mechanism.

Referring to the drawings, and more particularly to Figures 1 and 2, the reference numeral 10 indicates a supporting frame for the transmission mechanism; and this frame may be, for instance, a part of a machine to which this invention is applicable, an exemplary machine being a small milling machine or the like which has a tool spindle, for instance, which it is desired to drive at a number of different speeds. In such machines the space available for the transmission mechanism is very limited and therefore insufficient to contain a conventional design of variable speed shiftable gear transmission which will yield a satisfactory range of spindle speeds. Furthermore, such a transmission would unduly increase the cost for a small machine.

In order to more readily understand the application and usefulness of this invention the part to be driven is shown as a tool spindle and indicated by the reference numeral 11, although it will be readily understood that this spindle could be a driving spindle for a work supporting member or the like without departing from the spirit of this invention.

It is conventional practice in milling machine design, for instance, to have the tool spindle axially adjustable so as to vary the position of the tool with respect to the work and therefore the spindle is shown journaled in an adjustable quill member 12 by means of anti-friction bearings 13.

The spindle is held against movement with respect to the quill by providing a shoulder 14 on the spindle, and the inner races of the anti-friction bearings are clamped against this shoulder with the aid of a spacing member 15 by a nut 16 which is threaded at 17 on the spindle. The outer races of the anti-friction bearings are clamped between a shoulder 18 of the quill member 12 and a threaded member 19 which is internally threaded in the end of the quill member. It will thus be apparent that one end of the spindle is secured by the anti-friction thrust bearings 13 in the quill for axial movement therewith but for relative rotation with respect thereto.

Means are provided for longitudinally adjusting the quill in the bore 20 formed in the frame of the machine comprising rack teeth 21 which are cut in the periphery of the quill and interengaged by a worm gear 22 supported for rotation by the shaft 23. The member 22 also has bevel gear teeth 24 formed thereon which mesh with bevel gear teeth 25 formed on the end of adjusting spindle 26. This spindle has a hexagon head 27 and an indicating dial 28 connected therewith for imparting rotation to the member 22 and thereby creating axial adjustment of the quill.

The other end of the spindle 11 is provided with a reduced diameter 29 upon which is mounted the inner race 30 of an anti-friction bearing 31 for supporting that end of the spindle.

The outer race 32 is clamped in a hub member 33 between a shoulder 34 and a clamping sleeve 35. This arrangement permits the portion 29 of the spindle 11 to be axially adjusted relative to the bearing 31 upon axial adjustment of the quill.

The hub member 33 is provided with a shoulder 36 and anti-friction thrust bearing members 37 with the aid of a spacer 38 are clamped between shoulder 36 and the clamping nut 39 threaded on the end of the hub member. The outer races of the bearing members 37 are secured by a force fit in the bore 40 formed in the supporting frame 10. The construction is such that the hub member 33 is rotatably journaled in the frame of the machine, and the spindle 29 is supported for axial movement within the bore 41 of the hub member.

The hub member has a gear 42 formed integral on one end of it and this gear has a series of clutch teeth 43 formed in its end face for interengagement by similar clutch teeth 44 formed on the shiftable clutch member 45. The clutch member 45 is connected by means of splines 46 to the spindle 11 and is slidable on these splines to effect engagement or disengagement of the clutch teeth. By means of this connection it is apparent that the clutch member 45 may be moved axially relative to the spindle 11 to effect engagement or disengagement of the clutch teeth, and furthermore that regardless of the engaged or disengaged position of the clutch member 45, the spindle 11 may be moved by means of the quill relative to the clutch member, and therefore either one may be moved relative to the other. It should now be apparent that when the clutch is in its engaged position that rotation of the hub member will impart rotation to the spindle 11.

The hub member is adapted to be driven at a plurality of speeds by means of the following mechanism from a prime mover indicated by the reference numeral 47. For the purpose of this invention the prime mover 47 is secured by means of bolts 48, as more particularly shown in Figure 2, to a swinging frame 49 which is pivotally supported upon a shaft 50 which, as shown in Figure 1, is supported in suitable bores 51 formed in the frame of the machine. The pivoted frame carries a nut member 52 which is pivotally supported by trunnion means 53 between side bars 54 which are welded or otherwise secured to the frame 49.

The nut member 52 has an adjusting screw 55 threaded therein, and this adjusting screw has a reduced portion 56 by which it is journaled in the frame of the machine. A hand wheel 57 is secured to the end of the screw for imparting rotation thereto and a locking screw 58 is provided for radial engagement with the portion 56 for clamping the screw after adjustment.

It will be noted that the parts are so located with respect to the pivot 50 that rotation of the screw will effect raising or lowering of the prime mover 47 in a substantially vertical direction. The motor is connected to drive a pulley 59 which is shown as directly connected to the armature shaft 60 of the prime mover 47. For the purposes of this invention the pulley 59 is shown as a step cone pulley with each step in the form of a groove and thus there are four V-grooves 61, 62, 63, and 64.

The hub member 33 is also provided with a multiple sheave pulley 65 which also has four V-grooves 66, 67, 68, and 69 formed therein. The pulley 65 is keyed at 70 to a shifter sleeve 71 which has a sliding spline connection at 72 on the projecting end of the hub member 33.

The four grooved steps of one pulley are equal in diameter respectively to the four grooves in the other pulley, but by inversely mounting one pulley with respect to the other the smallest step 61 may be aligned with the largest step 66, and the largest step 64 of the pulley 59 may be aligned with the smallest step 69 of pulley 65. Thus by raising the motor, the belt 73, which interconnects these pulleys, may be shifted from one set of grooves to the next set of aligned grooves whereby a series of four different speeds, including a high speed, a low speed, and a plurality of intermediate speeds may be obtained for driving the spindle from the motor.

Means have been provided for shifting the pulley 65 so that an additional number of intermediate speeds may be obtained without increasing the amount of equipment. As previously stated, the pulley 65 is keyed to the shifter sleeve 71 and this sleeve is provided with a groove 74 in which fits a shifter fork 75 fixed to the end of a shifter rod 76. The shifter rod is slidably mounted in a bore 77 formed in the frame of the machine and is provided with rack teeth 78 engageable by a pinion 79. The pinion is fixed for rotation by a shifter lever 80 which has an operating knob 81. This knob is secured to the end of a pin 82 which is slideable in the end of the lever 80 and is adapted to be placed in any one of three different holes 83, 84, or 85 for locking the shifter pulley in any one of three positions 86, 87, or 88 which correspond respectively to the three holes.

It will be noted that the end of the pulley having the larger diameter is next to the frame or column of the machine and that the shifter fork engages the shifter groove of the sleeve 71 internally of this large diameter, thereby reducing overhang of the supporting shaft and pulley. This is very important as it results in a very compact structure. By shifting the pulley to the two additional positions, indicated by dotted lines in the drawings, two different sets of alignments of the pulley sheaves are obtained which yield a total of five additional different intermediate speeds, thereby increasing the total number of speeds available to nine speeds.

These speeds are available for driving the spindle through engagement of the clutch member 45 which is adapted to be shifted by a shifter fork 89 which is pivotally mounted on a fixed pin 90. The lever 89 carries a pin 91 which is engaged by the bifurcated end 92 of a bell crank lever 93 pivoted on a fixed pin 94. The bell crank lever has an operating knob 95 which is adapted to be held in either one of two positions by a pin 96 integral with the knob and insertable in holes 97 and 98 formed in the frame of the machine.

The lever 89 is provided on its upper end with a shifter fork 99 which is adapted to engage a back gear 100 of a gear couple 101 having a second gear 102 integral therewith. With the parts in the position shown in Figure 1 it will be obvious that rotation of the crank 93 in a clockwise direction will affect disengagement of the clutch 45 and will simultaneously interengage gear 100 with gear 42 and pinion gear 102 with gear 103 formed integral with the spindle, the parts then being in the position shown in Figure 3 of the drawings. This provides a back gear drive which obviously will increase the number of speeds available from nine speeds to eighteen speeds. It will be noted that the back gears will be locked in position by insertion of the pin 96 in the hole 98, and by making the pinion 102 a wide pinion the gear 103 may slide with respect to the gear 102 axially so that the quill adjustment of the spindle may be utilized without disturbing the engagement of the gears. Since the gear 42 is fixed with the hub member, this problem does not arise in connection with the gear pair 42—100.

It should now be apparent that a very compact and efficient variable speed transmission has been provided which is especially useful in small machines where it is desired to make available a large number of speeds with a minimum amount of equipment.

What is claimed is:

1. In a variable speed transmission, the combination with a driven member, of a power actuated driving member, means to support the driving member in parallel axial relationship to the driven member, means to adjust the driving member toward and from the driven member, cone pulleys mounted on the respective members, each having the same number of different diametered steps but said pulleys being mounted in inverse order whereby the largest diameter step of one pulley is aligned with the smallest diameter step of the other pulley, a belt shiftable to interconnect the various pairs of steps to produce a plurality of variable speeds, means to shift the driven pulley axially with respect to the axis of the other pulley to align the steps in different pairs, and means for laterally shifting the power actuated shaft toward and from the driven shaft to facilitate shifting of the motion transmitting means.

2. In a variable speed transmission for actuating a driven part, the combination of a pair of rotatable members supported for rotation about parallel axes, multiple diameter pulleys operatively connected to the respective members and in prescribed alignment, power operable means for driving one pulley, a belt shiftable with respect to said pulleys to interconnect them in a prescribed series of different speed ratios, means to shift one of said pulleys parallel to the other to provide a new alignment to produce an additional series of speeds, means to shift one of said members laterally toward and from the other to facilitate the shifting of said belt, and means to selectively interconnect said driven part in a plurality of different speed ratios with the driven pulley to further increase the number of available speeds.

3. In a variable speed transmission, the combination with a driven part, of a pair of rotatable members one of which is power actuated, multi-sheave pulleys operatively connected to said members, the series of sheaves of each pulley being of different diameters but inversely aligned, a belt for interconnecting a selected pair of sheaves, a shifter operatively connected to one of said pulleys for shifting it parallel to the other pulley to present a new series of speed positions, means to lock the shifter in any one of its different positions, a second shifter, means operated thereby for connecting said driven part to one of said rotatable members in different speed ratios, and means to lock said shiftable member in its various positions.

4. In a machine tool having a spindle and a quill adjusting mechanism for changing the axial position of said spindle, the combination of means for driving said spindle at a plurality of variable speeds regardless of its axial position including a rotatable member axially aligned with said spindle and in telescoping relation therewith, means to drive said member at a plurality of variable speeds including a pair of parallel aligned pulleys, said pulleys having a plurality of multi-diametered sheaves, one pulley being inversely arranged with respect to the other, a belt for interconnecting said sheaves in pairs to produce a prescribed series of speeds, means to shift one pulley with respect to the other to produce a different series of speeds, said rotatable member being axially fixed whereby the pulley and the spindle may be independently shifted relative thereto to insure actuation of the spindle regardless of its axial position.

5. In a machine tool having a support, a spindle and a quill adjusting mechanism for rotatably supporting said spindle in said support and imparting axial adjustment thereto, the combination of means for driving said spindle at a plurality of rates in all positions of adjustment thereof including a rotatable sleeve journaled in said support having a gear formed on one end thereof and a shiftable multiple sheave pulley mounted on the other end thereof, a power operable multiple sheave pulley mounted in said support with its sheaves in alignment with the sheaves of the first-named pulley, a belt for selectively connecting pairs of said sheaves for obtaining a first series of speeds, means to axially shift the first-named pulley with respect to the second-named pulley to realign said sheaves to produce a second series of speeds, a gear fixed with said spindle, means to directly clutch the gear on said sleeve with the spindle, a set of back gears, means to shift the back gears into engagement with the sleeve gear and spindle gear, one of said back gears being made of sufficient width to permit axial adjustment of the spindle.

6. In a machine tool having a support, a spindle and a quill adjusting mechanism rotatably supporting said spindle in said support and for imparting axial adjustment thereto, the combination of means for driving said spindle at a plurality of rates in all positions of axial adjustment thereof including a sleeve rotatably journaled in said support having a gear formed on one end thereof, a shiftable multiple sheave pulley mounted on the other end thereof, power operable means driving said pulley at a plurality of rates, a gear fixed with said spindle for axial movement therewith, a clutch splined on said spindle and shiftable into clutching engagement with said sleeve gear, means to lock the clutch in clutching position to permit axial movement of the spindle, a set of back gears, said locking means being shiftable to disengage said clutch means and effect operative engagement of the back gears with the sleeve gear and spindle gear, one of said back gears being made of sufficient width to permit axial adjustment of the spindle gear while maintaining engagement therewith.

MILLARD ROMAINE.
EDGAR D. VANCIL.

REFERENCES CITED

The following references are of record in the file of this patent:

UNITED STATES PATENTS

| Number | Name | Date |
|---|---|---|
| 1,169,232 | Bremner et al. | Jan. 25, 1916 |
| 1,363,786 | Hey | Dec. 28, 1920 |